(12) United States Patent
Heuft

(10) Patent No.: US 8,538,714 B2
(45) Date of Patent: Sep. 17, 2013

(54) TESTING THE INTEGRITY OF PRODUCTS IN CONTAINERS

(75) Inventor: Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 795 days.

(21) Appl. No.: 11/667,259

(22) PCT Filed: Nov. 9, 2005

(86) PCT No.: PCT/EP2005/055838
§ 371 (c)(1),
(2), (4) Date: Aug. 6, 2007

(87) PCT Pub. No.: WO2006/051078
PCT Pub. Date: May 18, 2006

(65) Prior Publication Data
US 2008/0061240 A1    Mar. 13, 2008

(30) Foreign Application Priority Data
Nov. 9, 2004    (DE) .......................... 10 2004 054 349

(51) Int. Cl.
*G01N 37/00*    (2006.01)
(52) U.S. Cl.
USPC .................. 702/82; 702/81; 702/84; 702/181
(58) Field of Classification Search
USPC ........................................... 702/81, 82, 181
See application file for complete search history.

(56) References Cited

U.S. PATENT DOCUMENTS

| 3,818,232 | A | * | 6/1974 | Kirkpatrick | 378/52 |
| 3,849,070 | A | * | 11/1974 | Garza et al. | 436/133 |
| 4,050,824 | A | * | 9/1977 | Woodrow et al. | 356/427 |
| 4,109,511 | A | * | 8/1978 | Powers et al. | 73/37.6 |
| 4,926,681 | A | * | 5/1990 | Fitzpatrick | 73/52 |
| 4,991,433 | A | * | 2/1991 | Warnaka et al. | 73/290 V |
| 5,002,397 | A | * | 3/1991 | Ingrum et al. | 356/407 |
| 5,202,932 | A | * | 4/1993 | Cambier et al. | 382/142 |
| 5,369,600 | A | * | 11/1994 | Ito et al. | 702/137 |
| 5,473,161 | A | * | 12/1995 | Nix et al. | 250/343 |
| 5,591,899 | A | * | 1/1997 | Griesbeck | 73/41 |
| 5,614,672 | A | * | 3/1997 | Legendre et al. | 73/437 |
| 5,750,998 | A |   | 5/1998 | Goldman |  |
| 5,806,519 | A | * | 9/1998 | Evans et al. | 600/431 |

(Continued)

FOREIGN PATENT DOCUMENTS

| DE | 34 17 338 A1 | 11/1985 |
| DE | 42 05 722 C2 | 9/1993 |

(Continued)

*Primary Examiner* — Alexander H Taningco
*Assistant Examiner* — Yaritza H Perez Bermudez
(74) *Attorney, Agent, or Firm* — Drinker Biddle & Reath LLP

(57) ABSTRACT

In order to test the integrity of products in containers, several characteristics of the products are detected with physical measuring methods and a good-bad signal is produced on the basis of the measuring results, for which purpose several of the measuring results are placed in relation to each other, which can consist in the following: the deviations of the individual measuring results from a reference value, optionally after weighting and standardization are added up and the sum is compared to a threshold value. The measuring results can also form a multidimensional area in which one or several boundary surfaces separate the good value areas from the bad value areas.

13 Claims, 1 Drawing Sheet

(56) References Cited

U.S. PATENT DOCUMENTS

| | | | | |
|---|---|---|---|---|
| 5,864,600 | A * | 1/1999 | Gray et al. | 378/57 |
| 5,869,747 | A * | 2/1999 | Hulsman | 73/52 |
| 6,104,033 | A | 8/2000 | Graeme | |
| 6,226,081 | B1 * | 5/2001 | Fantone et al. | 356/239.6 |
| 6,338,272 | B1 * | 1/2002 | Heuft et al. | 73/290 V |
| 6,494,083 | B1 * | 12/2002 | Heuft | 73/49.3 |
| 6,863,860 | B1 * | 3/2005 | Birckbichler et al. | 264/410 |
| 7,012,427 | B2 * | 3/2006 | Augustine et al. | 324/307 |
| 7,085,677 | B1 * | 8/2006 | Champlin et al. | 702/182 |
| 7,339,377 | B2 * | 3/2008 | Augustine et al. | 324/321 |
| 7,407,796 | B2 * | 8/2008 | Hammerstedt et al. | 435/287.2 |
| 7,624,622 | B1 * | 12/2009 | Mayer et al. | 73/38 |
| 7,971,470 | B2 * | 7/2011 | Broz | 73/31.03 |
| 2001/0004401 | A1 * | 6/2001 | Dubois et al. | 382/142 |
| 2002/0002414 | A1 | 1/2002 | Hsiung et al. | |
| 2002/0143513 | A1 * | 10/2002 | Cohen et al. | 703/17 |
| 2002/0168046 | A1 * | 11/2002 | Hansen | 378/51 |
| 2003/0023385 | A1 * | 1/2003 | Lazaridis | 702/19 |
| 2003/0140683 | A1 * | 7/2003 | Basir et al. | 73/54.41 |
| 2004/0090231 | A1 * | 5/2004 | Augustine et al. | 324/309 |
| 2004/0102864 | A1 * | 5/2004 | Stack et al. | 700/110 |
| 2004/0206658 | A1 * | 10/2004 | Hammerstedt et al. | 206/524.1 |
| 2005/0104589 | A1 * | 5/2005 | Augustine et al. | 324/312 |
| 2005/0276907 | A1 * | 12/2005 | Harris et al. | 427/8 |
| 2005/0280414 | A1 * | 12/2005 | Augustine et al. | 324/312 |
| 2007/0001673 | A1 * | 1/2007 | Augustine et al. | 324/307 |

FOREIGN PATENT DOCUMENTS

| | | |
|---|---|---|
| DE | 43 43 058 A1 | 6/1995 |
| RU | 2227320 C2 | 4/2004 |
| WO | WO 98/21557 A1 | 5/1998 |

* cited by examiner

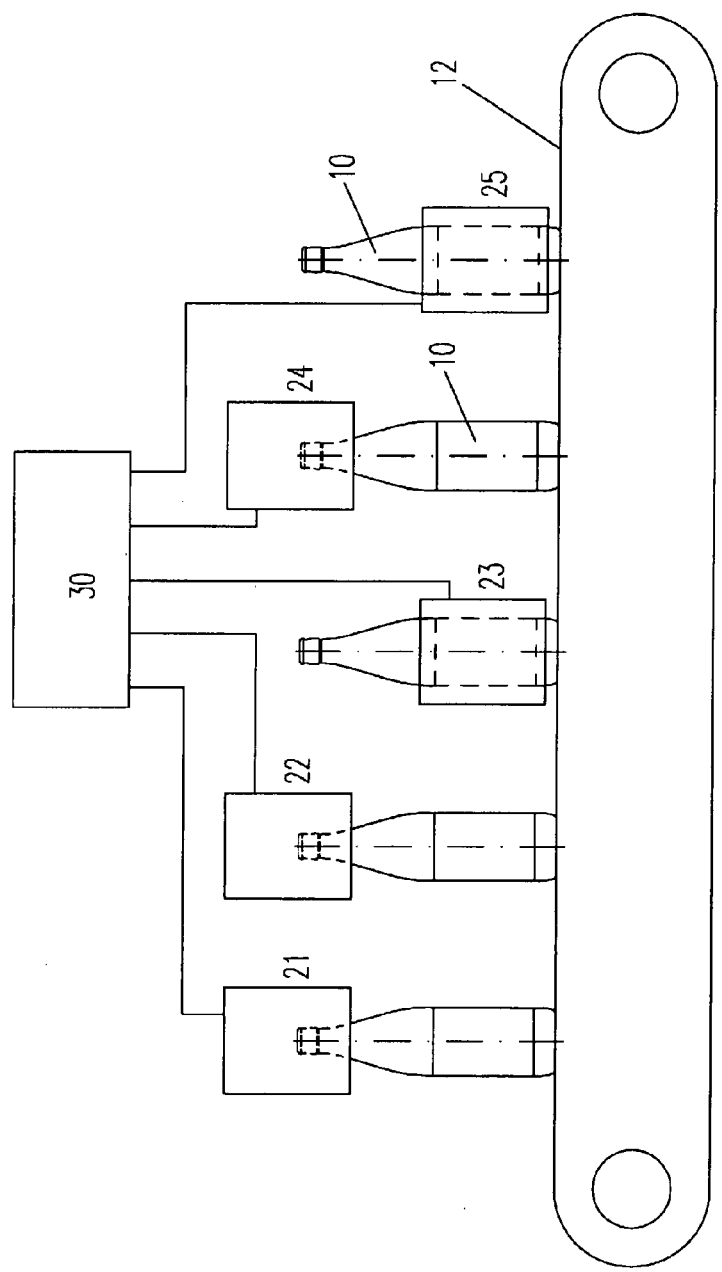

TESTING THE INTEGRITY OF PRODUCTS IN CONTAINERS

CROSS-REFERENCE TO RELATED APPLICATIONS

This application is the U.S. national phase of the International Patent Application No. PCT/EP2005/055838 filed Nov. 9, 2005, which claims the benefit of German Application No. 10 2004 054 349.6 filed Nov. 9, 2004, the entire content of which is incorporated herein by reference.

FIELD OF THE INVENTION

The invention relates to a method for testing the integrity of products in containers.

BACKGROUND OF THE INVENTION

Products in containers, in particular foods, e.g., drinks in plastic or glass bottles, can be investigated by using various physical measurement methods. The absorption of the product at specific wavelengths of light or infrared radiation can be measured, wherein the rotation of polarized light can also be measured. Similarly the absorption of X- or gamma radiation can be measured, wherein here the absorption depends on the atomic weight of the elements present in the product. By means of a high-frequency field it is possible to measure the dielectric constant which, in the case of drinks, depends in particular on the salt content. In addition to these material properties, macroscopic properties, e.g., the fill level of the product in the container or the mass of the product in the container can also be measured. In the German patent application 10 2004 053 567.1 (application date 5 Nov. 2004, Title: Method of establishing the integrity of a product located in a container, our reference 36144-de), a given feature of the product is determined by means of two different physical measurement methods, wherein differences between the values obtained according to both measurement methods of the given feature are an indication of damage to the integrity of the product. The fill level of the product in the container can be ascertained e.g., by means of X-ray absorption and by means of damping of an HF field. Both methods must be calibrated, as the X-radiation absorption depends on the atomic weight, and the damping of the HF field on the dielectric constant, of the product. If the values obtained with both measurement methods do not correspond to the same fill level, this means that either the atomic weight of the elements present in the product or the dielectric constant of the product do not correspond to the predefined values, i.e. to a whole or unadulterated product.

A multisensor camera for quality control is known from DE-A-43 43 058 in which various imaging sensors operating on different physical principles such as b/w and colour cameras, imaging 3D sensors, imaging sensors which operate with penetrating radiation and imaging NIR spectroscopy sensors, are used together. The sensors are arranged so that they cover the same field of vision and corresponding image elements of the sensors relate to identical image elements of the product surface. The signals of the sensors are converted image-by-image, using a classifier, into a group image in which a code is allocated to each image element, corresponding to its membership of one of numerous, previously taught classes. By means of this multisensor camera it is possible to separate out shredded metal and plastic waste from a random refuse stream.

The integrity or unadulterated nature of a product in a container is at present determined by chemical laboratory tests, for which the product is taken out of the container.

BRIEF SUMMARY OF THE INVENTION

The object of the invention is to test the integrity of a product contained in a container, in particular of a product contained in a sealed container.

According to the invention this object is achieved by using a method of the type mentioned at the outset, by correlating several of the measurement results in order to produce the good-bad signal.

Because several features of the product are checked, integrity can be ensured with greater reliability than if only a single feature is checked.

The measurement results can be correlated in various ways. A few possibilities are listed below:

The measurement values are standardized to a reference value which is the value for a defect-free product. The standardized measurement results then give the deviation as a factor or percentage. The deviations of the measurement results from the respective reference values can be added up as scalar values. If the sum of the deviations exceeds a threshold value, a "bad" signal is produced. It is possible to weight the individual measurement results so that the individual measurement methods have a varying degree of influence on the result.

The measurement results can form a multidimensional space in which one or more interfaces separate the good and the bad value ranges from each other. This interface can be expressed by a function with a number of variables corresponding to the number of measurement results. A simple case for a mathematical equation is the spherical surface in a multidimensional space ($R^2=u^2+v^2+w^2+x^2 \ldots$). Mixed terms can however also occur in this equation, i.e., the influencing of a measurement result can depend on the value of another measurement result. The good-bad interface does not then have a spherical shape, but any irregular shape. In practice it is simpler to read in a corresponding table of values during operation.

Finally the measurement results can also be linked to each other by fuzzy logic.

All the methods suitable for investigating the product in question can be considered as measurement methods. In the case of drink bottles these are in particular colour, IR, X-ray or gamma spectroscopy, determination of the rotation of polarized light through the product, determination of the fill level or determination of the pressure inside container.

For the determination of drinks in glass or plastic bottles, the combination of NIR-spectroscopy, the measurement of X-ray absorption and the measurement of the dielectric modulus has in particular proved successful. NIR-spectroscopy can already be regarded for itself as a plurality of measurement methods, corresponding to the number of investigated absorption peaks.

When checking individual containers filled with the product, depending on the measurement method used, relatively large deviations must in some cases be permitted as, e.g., in the case of glass or plastic bottles, the wall thickness of the container can very greatly influence the measurement result. According to a preferred method the measurement results initially of one measurement method are therefore averaged over a large number of containers. For the values averaged over a larger number of containers of the individual features of the product much smaller permitted deviations can be applied. With this version of the invention systematic product defects, whether caused intentionally or unintentionally, can therefore be recorded with high reliability.

The averaging is expediently carried out on a sliding basis, i.e., the average value is in each case formed over a specific number of the most recently checked containers. For example the last hundred containers can be used for averaging in each case.

The individual measurement results can of course additionally be evaluated in themselves in the conventional manner, i.e., if an individual measurement result does not lie within a specific range the container concerned is excluded from the further production process.

Overall the measurement results are thus used in three ways:

Each measurement result is checked for itself to ascertain whether it lies within a specific range. If it lies outside the range, the container is excluded;

The measurement results of several measurement methods are correlated, e.g., the percentage deviations from the reference values concerned are added in scalar manner, and the sum of the deviations is compared with a threshold value. They can also be introduced into a first- or higher-order equation with a corresponding number of variables and, depending on whether the product concerned in this multidimensional space lies inside or outside a good-bad interface, the container is further processed or excluded.

The average of the measurement results of the individual measurement methods is formed over a larger number of containers and this average can again, as in the first case, be compared with a reference value separately for each measurement method and/or the averages of the measurement results of several measurement methods can be correlated as stated under 2.

A particular advantage of the method according to the invention is that the container can be tested while sealed and thus at the end of the production process, added to which subsequent damage to its integrity is largely excluded.

BRIEF DESCRIPTION OF THE DRAWINGS

FIG. 1 shows a device for testing the integrity of drink bottles.

DETAILED DESCRIPTION OF THE INVENTION

A number of drink bottles 10 are transported through several inspection devices 21 to 25 following each other at a small distance on a conveyor 12.

In the first and second inspection devices 21, 22 the fill level of the drink in the bottle 10 is ascertained by means of X-rays and an HF field, respectively. The values ascertained for the fill level are transmitted to a control device 30 in which the values are compared.

In the third inspection device 23 the X-ray absorption in the lower, cylindrical area of the bottles 10 is measured.

In the fourth inspection device 24 the pressure inside the container is measured by means of the method known from WO 98/21557.

In the fifth inspection device 25 the absorption of a 1.06 μm infrared beam is measured.

The measured values of all the inspection devices 21 to 25 are transmitted to the control device 30.

As already mentioned, the signals from the first and second inspection devices 21, 22 are compared with each other and a fill-level-difference signal is formed from both signals. The fill-level-difference signal must not exceed a predefined threshold value S for each individual container. The values from the other three inspection devices 23, 24 and 25 are in each case compared with a reference value, wherein for each individual container the deviation from the reference value must not exceed 10%.

For each container, the percentage deviations reported by the inspection devices 23, 24 and 25 from the reference value are also added up, wherein the sum of the percentage deviations must not exceed 20%.

Furthermore the average of the fill-level-difference signals of the last hundred bottles 10 is formed and this average must not exceed one-tenth of the threshold value S. Similarly the average of the signals from the inspection devices 23, 24 and 25 of the last hundred bottles 10 is formed and this average must deviate by no more than one-fifth from the value of the respective reference values which applies to the deviation of the individual bottles 10, thus 2%.

In addition the sum of the squares of the percentage deviations of the values averaged in each case over one hundred bottles 10 is calculated and this sum must not exceed a predefined further threshold value. This threshold value is set such that an error signal is already produced if the deviations of the measured values of the inspection devices 23, 24 and 25 considered for themselves are still acceptable.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

The invention claimed is:

1. A method for testing the integrity of a consumable product that is a food or a beverage in a sealed container, the method comprising:
   sealing the consumable product in the container;
   determining a plurality of the consumable product features while sealed in the container through the use of measurements for a plurality of differing physical properties directly associated with the consumable product by a plurality of differing inspection device types;
   standardizing results of the plurality of the measurements for the differing physical properties of the consumable product to respective reference values that are the measurement values of the differing physical properties for a defect-free specimen of the consumable product;

totaling up deviations of the standardized measurement results from the respective reference values to obtain a correlated result for the consumable product that is based on the combined measurements for the differing physical properties; and obtaining an indication for the product status on the basis of comparing the correlated result to a threshold value and producing a signal or alarm if the correlated result exceeds the threshold value.

2. The method of claim 1, wherein the plurality of differing physical properties measured include one or more of color, infrared, X-ray or gamma spectroscopy, the rotation of polarized light through the product, the fill level, and the pressure inside the container.

3. The method of claim 1, wherein the plurality of product features determined as a result of the plurality of differing physical property measurements forms a multidimensional space in which one or more interfaces separate good and the bad value ranges from each other.

4. The method of claim 1, wherein the standardized measurement results are linked to each other by fuzzy logic.

5. The method of claim 1, wherein the plurality of product features determined as a result of the plurality of differing physical property measurements are averaged over a plurality of containers.

6. The method of claim 5, wherein one or more of the plurality of product features are evaluated separately for each product in a container.

7. The method of claim 6, further comprising:
averaging the differing physical property measurement results over several products; and
correlating the averaged measurement results in order to produce a further good-bad signal.

8. The method of claim 1, wherein the step of totaling up the deviations of the standardized measurement results from the respective reference values involves the addition of the deviations as scalar values.

9. The method of claim 8, wherein the standardized measurement results of the plurality of differing physical property measurements are weighted.

10. The method of claim 8, wherein the totaling step involves the addition of the squares of the deviations.

11. The method of claim 8, wherein the totaling step involves the addition of the higher powers of the percentage deviations.

12. The method of claim 1, wherein the totaling step involves the addition of percentage deviations.

13. The method of claim 1, wherein the product being tested is a liquid.

* * * * *